United States Patent [19]

Udagawa

[11] Patent Number: 4,998,741

[45] Date of Patent: Mar. 12, 1991

[54] METAL PLATE WITH REINFORCING BEAD AND A CYLINDER HEAD GASKET INCLUDING THE SAME

[75] Inventor: Tsunekazu Udagawa, Ichikawa, Japan

[73] Assignee: Ishikawa Gasket Co. Ltd., Tokyo, Japan

[21] Appl. No.: 377,446

[22] Filed: Jul. 10, 1989

[30] Foreign Application Priority Data

Jul. 9, 1988 [JP] Japan .............................. 63-91156[U]

[51] Int. Cl.$^5$ .............................................. F16J 15/12
[52] U.S. Cl. ................................ 277/235 B; 277/234; 277/236
[58] Field of Search ............... 277/235 B, 235 R, 234, 277/236

[56] References Cited

U.S. PATENT DOCUMENTS

| | | | |
|---|---|---|---|
| 4,451,051 | 5/1987 | Nicholson | 277/235 B |
| 4,662,643 | 5/1987 | Rosenquist | 277/235 B |
| 4,688,809 | 8/1987 | Deppe | 277/235 B |
| 4,714,260 | 12/1987 | Udagawa | 277/235 B |
| 4,728,110 | 3/1988 | Nakasone | 277/235 B |
| 4,739,999 | 4/1988 | Ishii et al. | 277/235 B |
| 4,759,585 | 7/1988 | Udagawa | 277/235 B |
| 4,767,124 | 8/1988 | Udagawa | 277/235 B |
| 4,799,695 | 1/1989 | Yoshino | 277/235 B |
| 4,809,653 | 3/1989 | Udagawa et al. | 277/235 B |
| 4,815,750 | 3/1989 | Yoshino | 277/235 B |
| 4,834,399 | 5/1989 | Udagawa et al. | 277/235 B |

*Primary Examiner*—Allan N. Shoap
*Assistant Examiner*—Daniel G. DePumpo
*Attorney, Agent, or Firm*—Kanesaka and Takeuchi

[57] ABSTRACT

In the present invention, a metal plate is used as a cylinder head gasket. The metal plate is provided with at least one dividing area between adjacent two cylinder holes, and at least one reinforcing bead situated in the dividing area to extend along the longitudinal direction thereof. The reinforcing bead operates to strengthen the dividing area and to seal thereat. The metal plate may be incorporated with other plates to constitute a steel laminate gasket.

8 Claims, 1 Drawing Sheet

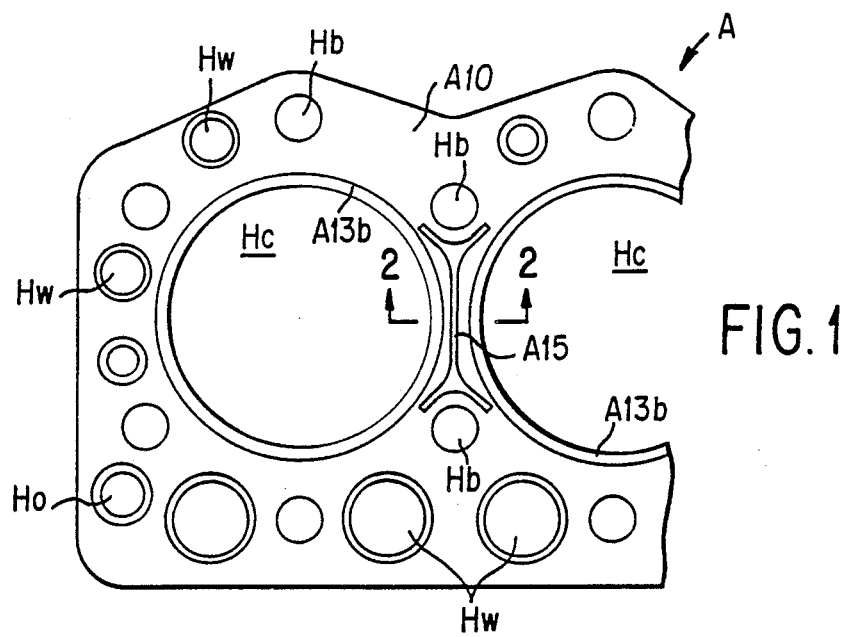
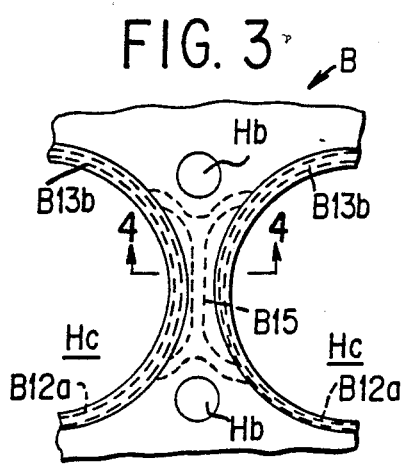
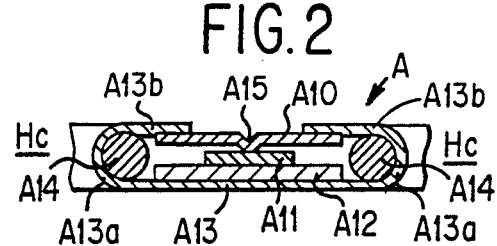
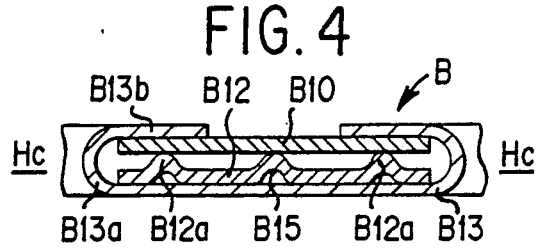
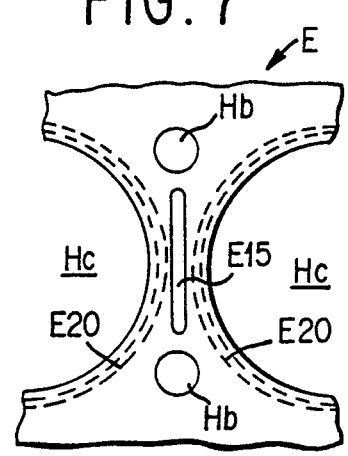
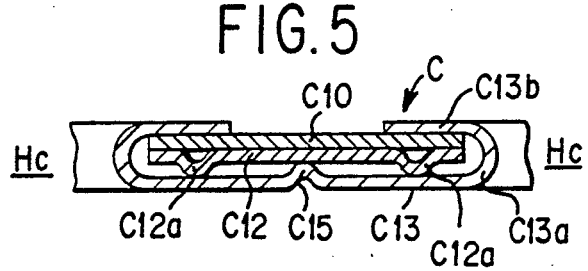
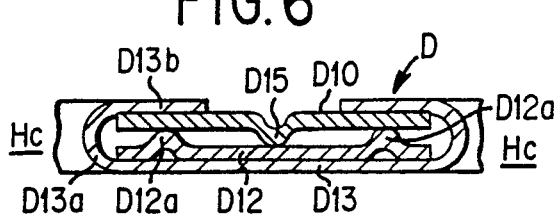

4,998,741

METAL PLATE WITH REINFORCING BEAD AND A CYLINDER HEAD GASKET INCLUDING THE SAME

BACKGROUND OF THE INVENTION AND RELATED ART STATEMENT

The present invention relates to a metal plate with a reinforcing bead and a cylinder head gasket including the metal plate with the reinforcing bead.

Recently, automobile engines have been developed to provide high power. Also, engines have been designed to become small in size and light in weight. For this purpose, an engine, especially a cylinder head, is made of light metal, such as aluminum alloy, and the distance between the adjacent cylinder holes becomes narrower.

In the combustion chambers, fuel combusts in series with predetermined intervals. Therefore, a cylinder head gasket is affected directly by combustion. As a result, creep relaxation of the cylinder head gasket may occur at an area between the cylinder holes. Also, as the distance between the cylinder holes becomes narrower, it becomes difficult to tightly seal areas between the adjacent cylinder holes. Accordingly, it is very important in the cylinder head gasket how areas between the adjacent cylinder holes are tightly sealed.

Accordingly, one object of the present invention is to provide a metal plate for a cylinder head gasket, wherein creep relaxation of the metal plate is substantially prevented.

Another object of the invention is to provide a metal plate as stated above, wherein durability of the metal plate is enhanced.

A further object of the invention is to provide a steel laminate gasket, wherein creep relaxation of the gasket is substantially prevented.

A still further object of the invention is to provide a metal plate and a steel laminate gasket using the metal plate, which can be easily and economically manufactured.

Further objects and advantages of the invention will be apparent from the following description of the invention.

SUMMARY OF THE INVENTION

In accordance with the present invention, a metal plate with or without other plates constitutes a cylinder head gasket for an engine having a plurality of cylinder holes therein.

The metal plate is provided with a plurality of first holes corresponding to the cylinder holes of the engine, at least one dividing area located between the adjacent two first holes, and at least one reinforcing bead situated in the dividing area. The reinforcing bead extends substantially throughout the dividing area along the longitudinal direction thereof.

A plurality of sealing beads may be formed around the first holes. The sealing beads and reinforcing bead project in the same direction. End portions of the reinforcing bead may intersect the sealing beads.

In the metal plate, the reinforcing bead is formed at the dividing area between the cylinder holes. Therefore, even if the dividing area is exposed to high temperature, creep relaxation does not substantially occur at the dividing area. Further, since the reinforcing bead divides the adjacent two cylinder holes, sealing between the cylinder holes is enhanced.

The metal plate with the reinforcing bead may be incorporated with one or more metal plates to constitute a steel laminate gasket. The reinforcing bead may be formed on upper, lower or middle plate.

In the steel laminate gasket, the reinforcing bead may be formed on a plate different from a plate where the sealing beads are formed. Wire rings, or some other sealing means may be used instead of the sealing beads.

BRIEF DESCRIPTION OF THE DRAWINGS

FIG. 1 is a plan view of a part of a first embodiment of a steel laminate gasket having a metal plate with a reinforcing bead of the present invention;

FIG. 2 is an enlarged section view taken along line 2—2 in FIG. 1;

FIG. 3 is a plan view of a part of a second embodiment of a steel laminate gasket of the invention;

FIG. 4 is an enlarged section view taken along line 4—4 in FIG. 3;

FIGS. 5 and 6 are section views, similar to FIG. 2, of third and fourth embodiments of a steel laminate gasket of the invention; and FIG. 7 is a plan view of one embodiment of a metal plate to be used as a cylinder head gasket of the invention.

DETAILED DESCRIPTION OF PREFERRED EMBODIMENTS

Referring to FIGS. 1 and 2, a first embodiment A of a steel laminate gasket of the invention is shown. The gasket A is a cylinder head gasket and is provided with cylinder holes Hc, water holes Hw, oil holes Ho and the like, as in the conventional gasket. In the present invention, any kind of sealing means may be used around water holes Hw and oil holes Ho. Therefore, sealing means of the water holes Hw and oil holes Ho is not explained.

As shown in FIG. 2, the gasket A comprises an upper plate A10, middle plates A11, A12 and a lower plate A13. The upper plate A10 and the middle plate A12 have the same shape and extend substantially through the entire area of the gasket A. The middle plate A11 has a shape similar to the middle plate A12, but has a narrow area between the cylinder holes Hc.

The lower plate A13 extends substantially throughout the entire area of the gasket A. In addition, the lower plate A13 has curved portions A13a around the cylinder holes Hc and flanges A13b located above the upper plate A10. Wire rings A14 are situated adjacent the curved portions A13a to seal around the cylinder holes Hc.

The upper plate A10 is provided with reinforcing beads or projections A15 at areas between the two adjacent cylinder holes Hc, respectively. The bead A15 extends toward the middle plate A11. End portions of the bead A15 are bifurcated to partly surround the bolt holes Hb, respectively.

In the gasket A, the upper plate A10 is provided with the beads A15 between the two cylinder holes Hc, respectively. Therefore, the area between the two cylinder holes Hc is strengthened by the bead A15. Even if the area between the two cylinder holes Hc is exposed to high temperature from combustion chambers, creep relaxation of the upper plate A10 with the bead A15 does not occur.

Namely, the upper plate A10 is located adjacent to the cylinder head and is exposed to high temperature, but since the upper plate A10 is provided with the bead A15, the strength of the plate A10 at the area between the two cylinder holes does not substantially change. The creep relaxation of the plate A10 is substantially prevented. The other plates are away from the cylinder head, so that the creep relaxation does not occur on the other plates.

Further, when the gasket A is tightened, the bead A15 is compressed and forms a plurality of corrugated beads, because a top of the bead A15 is at least bent in the opposite direction. The corrugated beads seal between the two cylinder holes Hc. Namely, leakage between the cylinder holes Hc is substantially prevented.

In the gasket A, creep relaxation is substantially prevented, and the sealing between the cylinder holes Hc is enhanced even in a small engine with high power.

FIGS. 3 and 4 show a second embodiment B of a steel laminate gasket of the invention. The gasket B comprises an upper plate B10, a middle plate B12, and a lower plate B13 with curved portions B13a and flanges B13b, as in the gasket A. The gasket B does not have wire rings similar to the wire ring A14, and - instead, the middle plate B12 is provided with beads B12a around the cylinder holes Hc to seal therearound.

Also, the middle plate B12 is provided with a reinforcing bead B15 at an area between the cylinder holes Hc. The bead B15 is bifurcated at end portions thereof and intersects the adjacent beads B12a, as shown in dot lines of FIG. 3. Therefore, when the gasket B is tightened, the area between the two cylinder holes is securely sealed. Namely, even if gas leaks through the bead B12a at the area between the two cylinder holes Hc, that area is completely sealed by the bead B15 as well. The leaked gas does not pass through the bead B15.

In the gasket B, the strength of the gasket B is enhanced. Also, leakage of the gas from the cylinder holes is substantially prevented.

FIG. 5 shows a third embodiment C of a steel laminate gasket of the invention. The gasket C comprises an upper plate C10, a middle plate C12, and a lower plate C13 with curved portions C13a and flanges C13b, as in the gasket B. In the gasket C, the middle plate C12 includes beads C12a around the cylinder holes Hc to seal therearound, and a reinforcing bead C15 is formed on the lower plate C13 to extend at an area between the cylinder holes. The rest of the structure of the gasket C is the same as the gasket B. The gasket C operates as in the gasket B.

FIG. 6 shows a fourth embodiment D of a steel laminate gasket of the invention. The gasket D comprises an upper plate D10, a middle plate D12 with beads D12a around the cylinder holes Hc, and a lower plate D13 with curved portions D13a and flanges D13b, as in the gasket B. However, in the gasket D, a reinforcing bead D15 is formed on the upper plate D10 to project toward the middle plate D12. The rest of the structure of the gasket D is the same as the gasket B. The gasket D operates as in the gasket B.

FIG. 7 shows a steel plate E, which can be used as a cylinder head gasket of the invention. The plate E includes cylinder holes Hc, water holes Hw, oil holes Ho, bolt holes Hb, and so on, as in the gasket A. Beads E20 are formed around the cylinder holes Hc to seal therearound, and beads (not shown) are formed as well to seal around the water holes Hw and oil holes Ho.

In the plate E, a reinforcing bead E15 is formed at an area between the cylinder holes Hc. The reinforcing bead E15 operates to strengthen an area between the cylinder holes Hc and to seal therebetween.

In accordance with the present invention, a reinforcing bead is formed on a gasket at an area between the two cylinder holes. In this area, since high temperature and pressure are applied when an engine is operated, it is very difficult to seal.

In the present invention, since the reinforcing bead is formed at the area between the two cylinder holes, strength of the gasket is improved, and sealing ability is enhanced.

While the invention has been explained with reference to the specific embodiments of the invention, the explanation is illustrative and the invention is limited only by the appended claims.

What is claimed is:

1. A metal plate for a cylinder head gasket adapted to be installed in an internal combustion engine having a plurality of cylinder holes therein, comprising:
    a plurality of first holes corresponding to the cylinder holes of the engine,
    a sealing bead formed around each first hole,
    at least one dividing area located between the respective sealing beads of adjacent first holes, and having a longitudinal extent which defines the longest linear dimension of said dividing area, said dividing area receiving high heat and pressure due to combustion of gas in the cylinder holes when the engine is operated, and
    at least one reinforcing bead situated in the dividing area, said reinforcing bead having an elongated, substantially straight portion extending substantially inside the dividing area along the direction of said longitudinal extent at a predetermined distance away from the respective sealing beads adjacent the first holes to strengthen the dividing area, said reinforcing bead preventing creep relaxation of the metal plate at the dividing area created by high heat and pressure due to combustion of gas in the cylinder holes, and forming, when the metal plate is compressed, a plurality of corrugated beads to tightly seal between the adjacent cylinder holes.

2. A metal plate according to claim 1, wherein said reinforcing bead and sealing beads project in the same direction.

3. A metal plate according to claim 2, wherein said reinforcing bead extends toward the sealing beads at end portions bounding said substantially straight portion to intersect said sealing beads.

4. A steel laminate type cylinder head gasket for an internal combustion engine having a plurality of cylinder holes therein, comprising:
    a first plate having a plurality of first holes corresponding to the cylinder holes of the engine,
    a second plate having a plurality of second holes corresponding to the cylinder holes of the engine,
    at least one middle plate situated between the first and second plates and having a plurality of third holes corresponding to the cylinder holes of the engine,
    sealing means formed around the respective cylinder holes of the engine to securely seal around the cylinder holes,
    at least one dividing area formed on the first, second and middle plates and located between the respective sealing means of adjacent cylinder holes and having a longitudinal extent which defines the longest linear dimension of said dividing area, said dividing area receiving high heat and pressure due to combustion of gas in the cylinder holes when the engine is operated, and at least one reinforcing bead formed on one of the first, second and middle plates, said reinforcing bead being situated in the dividing area and extending substantially therethrough along the direction of said longitudinal extent at a predetermined distance away from the respective sealing means adjacent the cylinder holes of the engine, said reinforcing bead preventing creep relaxation of the plates where the reinforcing bead is formed which is created by high heat and pressure due to combustion of gas in the cylinder holes, and forming, when the gasket is tightened, a plurality of corrugated beads to tightly seal between the adjacent cylinder holes.

5. A steel laminate gasket according to claim 4, wherein said sealing means are sealing beads formed on the middle plate.

6. A steel laminate gasket according to claim 5, wherein said reinforcing bead is formed on the middle plate and projects in the same direction as the sealing beads.

7. A steel laminate gasket according to claim 6, wherein the reinforcing bead extends toward the sealing beads at end portions bounding said substantially straight portion to intersect said sealing beads.

8. A steel laminate gasket according to claim 5, wherein said reinforcing bead is formed on one of the first and second plates and extends toward the middle plate, said sealing beads formed on the middle plate extending toward one of the first and second plates where the reinforcing bead is formed.

* * * * *